(12) United States Patent
Gordon

(10) Patent No.: US 9,118,923 B2
(45) Date of Patent: Aug. 25, 2015

(54) RECONSTRUCTION AND OVERLAP TRANSFORM SYSTEM AND METHOD SUPPORTING VC-1 DECODING

(75) Inventor: Stephen Gordon, N. Andover, MA (US)

(73) Assignee: Broadcom Corporation, Irvine, CA (US)

( * ) Notice: Subject to any disclaimer, the term of this patent is extended or adjusted under 35 U.S.C. 154(b) by 2959 days.

(21) Appl. No.: 11/412,669

(22) Filed: Apr. 27, 2006

(65) Prior Publication Data

US 2006/0245494 A1    Nov. 2, 2006

Related U.S. Application Data

(60) Provisional application No. 60/675,166, filed on Apr. 27, 2005.

(51) Int. Cl.
  *H04N 7/18* (2006.01)
  *H04N 19/44* (2014.01)
  *H04N 19/61* (2014.01)

(52) U.S. Cl.
  CPC . *H04N 19/44* (2014.11); *H04N 7/50* (2013.01)

(58) Field of Classification Search
  CPC .. H04N 7/50; H04N 7/26335; H04N 7/26707
  USPC ........................................ 375/240.01–240.29
  See application file for complete search history.

(56) References Cited

U.S. PATENT DOCUMENTS 7,305,139 B2 * 12/2007 Srinivasan et al. ............ 382/248
7,369,709 B2 *  5/2008 Hsu et al. ...................... 382/248

OTHER PUBLICATIONS

Proposed SMPTE Standard for Television: VC-1 Compressed Video Bitstream Format and Decoding Process, pp. 1-500, (Aug. 2005).*
"H.264 & IPTV Over DSL—Enabling New Telco Revenue Opportunities," White Paper, Intel/Envivio, May 15, 2004, available at http://www.envivio.com/images/products/H264whitepaper.pdf.*

* cited by examiner

*Primary Examiner* — Andy Rao
(74) *Attorney, Agent, or Firm* — Brinks Gilson & Lione

(57) ABSTRACT

Presented herein are reconstruction and overlap transform system(s) and method(s) supporting VC-1 decoding. In one embodiment, there is presented a system for reconstructing pixels. The system comprises a first circuit and a second circuit. The first circuit reconstructs pixels from residuals, where the residuals encode video data in accordance with a first encoding standard. The second circuit reconstructs pixels from residuals, where the residuals encode video data in accordance with a second encoding standard.

20 Claims, 4 Drawing Sheets

RECONSTRUCTION AND OVERLAP TRANSFORM SYSTEM AND METHOD SUPPORTING VC-1 DECODING

RELATED APPLICATIONS

This application claims priority to "Reconstruction And Overlap Transform System And Method Supporting VC-1 Decoding," U.S. Provisional Application for Patent Ser. No. 60/675,166, filed Apr. 27, 2005 by Gordon.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

There are a variety of standards for encoding and compressing video data. Among the standards are MPEG-2, the ITU-H.264 Standard (H.264) (also known as MPEG-4, Part 10, and Advanced Video Coding), and VC-1.

A decoder that is capable of decoding video data encoded with numerous standards is also capable of decoding a greater amount of video content. However, the foregoing standards have a number of differences that complicate the decoding.

The MPEG-2, H.264, and VC-1 standards have a number of differences. For example, the VC-1 standard uses quantized frequency coefficient prediction. Quantized frequency coefficient prediction is not used in either MPEG-2 or H.264. Additionally, MPEG-2 and H.264 use different scale factors for AC components, while VC-1 uses the same scale factors for the AC components. MPEG-2, H.264, and VC-1 also use different scan tables, blocks, and transformation blocks.

Additional limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are reconstruction and overlap transform system(s) and method(s) supporting VC-1 decoding, substantially as shown and/or described in the following description and in connection with at least one of the figures.

These and other advantages and novel features of the present invention, as well as illustrated embodiments thereof will be more fully understood from the following description and drawings.

DETAILED DESCRIPTION OF THE INVENTION

According to certain aspects of the present invention, a decoder is operable to inverse quantize and inverse transform video data encoded in accordance with the MPEG-2, H.264, and VC-1 standards.

MPEG-2 uses a transformation, quantization and scanning to encode pixel data. The transformation results in coefficients that are then quantized and scanned. VC-1 uses a different transformation, and usesprediction to predict quantized coefficients. While H.264 also predicts frequency coefficients, H.264 predicts the frequency coefficients in a different manner from VC-1.

The blocks of quantized frequency coefficients or predicted quantized frequency coefficients are then scanned. MPEG-2, H.264, and VC-1 each use different scanning techniques. In VC-1, where quantized frequency prediction is used, the scanning technique used depends on whether the top row or left column is predicted.

The scanning reorders the frequency coefficients in a manner that is likely to place the quantized frequency coefficients with the greatest magnitude first, followed by the quantized frequency coefficients with lower magnitudes, and quantized frequency coefficients with zero magnitude last. The scanned and quantized frequency coefficients can then be coded as run level pairs. Run level pairs include levels L representing a quantized frequency coefficient, followed by a run R indicating the number of quantized frequency coefficients that follow that are zero (if any).

As can be seen from the foregoing discussion, there are number of differences between MPEG-2, H.264, and VC-1. It should be understood that foregoing discussion is not intended as an exhaustive, but rather as an illustrative discussion of the differences between MPEG-2, H.264, and VC-1.

Figure 1:
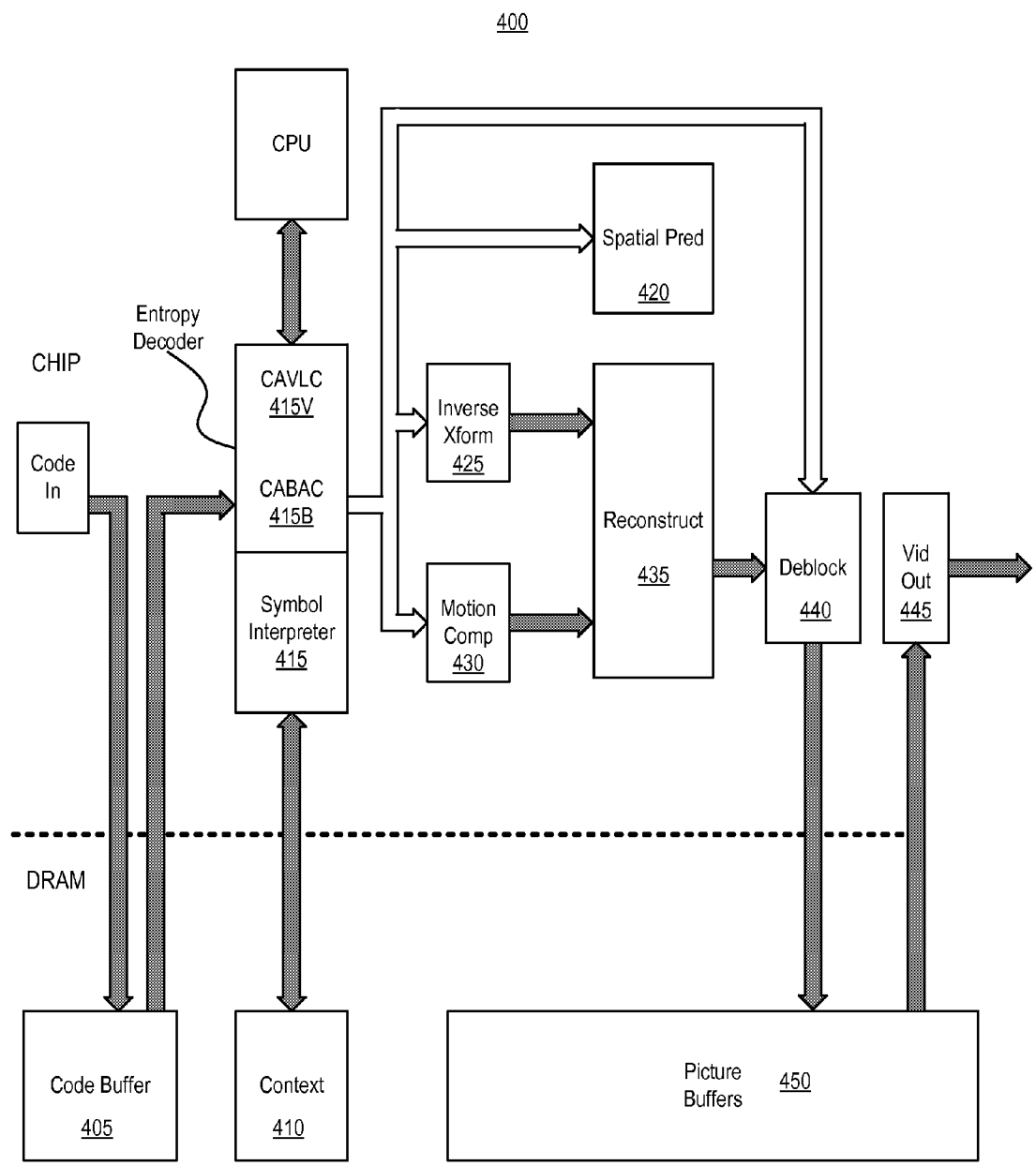
FIG. 1 is a block diagram of a video decoder in accordance with an embodiment of the present invention.

Referring now to FIG. 1, there is illustrated a block diagram describing an exemplary video decoder 400 in accordance with an embodiment of the present invention. The video decoder 400 includes a code buffer 405 for receiving a video elementary stream. The code buffer 405 can be a portion of a memory system, such as a dynamic random access memory (DRAM). A symbol interpreter 415 in conjunction with a context memory 410 decode the CABAC and CAVLC symbols from the bitstream. The context memory 410 can be another portion of the same memory system as the code buffer 405, or a portion of another memory system.

The symbol interpreter 415, includes an entropy decoder 415. In certain embodiments, the entropy decoder 415 can include a CAVLC decoder 415V and a CABAC decoder 415B, such as for decoding AVC. The CAVLC decoder 415V decodes CAVLC symbols, resulting in the sets of scanned quantized frequency coefficients. The CABAC decoder 415B decodes the CABAC symbols resulting in the side information.

The symbol interpreter 415 provides the sets of scanned quantized frequency coefficients to an inverse scanner, quantizer, and transformer (ISQT) 425. Depending on the prediction mode for the macroblock associated with the scanned quantized frequency coefficients, the symbol interpreter 415 provides the side information to either a spatial predictor 420 (if spatial prediction) or a motion compensator 430 (if temporal prediction).

The ISQT 425 constructs the residuals E. The spatial predictor 420 generates the predictions P for spatially predicted macroblocks while the motion compensator 430 generates the predictions P, or P0, P1 for temporally predicted macroblocks. The motion compensator 430 retrieves the predictions P, or P0, P1 from picture buffers 450 that store previously decoded frames 100 or fields 110.

A pixel reconstructor 435 receives the residuals E from the ISQT 425, and the predictions from either the motion compensator 430 or spatial predictor 420. The pixel reconstructor 435 reconstructs the macroblock 120 from the foregoing information and provides the macroblock 120 to a deblocker 440. For example, in the VC-1 case, the reconstructor can include an overlap transform filter. The deblocker 440 smoothes pixels at the edge of the macroblock to prevent the appearance of blocking. The deblocker 440 writes the decoded macroblock 120 to the picture buffer 450.

A display engine 445 provides the frames from the picture buffer 450 to a display device. The symbol interpreter 415, the ISQT 425, spatial predictor 420, motion compensatory 430, pixel reconstructor 435, and display engine 445 can be hardware accelerators under the control of a central processing unit (CPU). The CPU performs a number of functions, including the management of off-chip DRAM that is allocated to the video decoder 400.

The pixel reconstructor 435 is capable of reconstructing pixels from video data that is encoded in accordance with the MPEG-2, H.264, and VC-1 standards. The CPU communicates the type of video data that is received by the pixel reconstructor 435. Additionally, the CPU allocates a portion of the off-chip memory DRAM to the pixel reconstructor 435.

Figure 2:
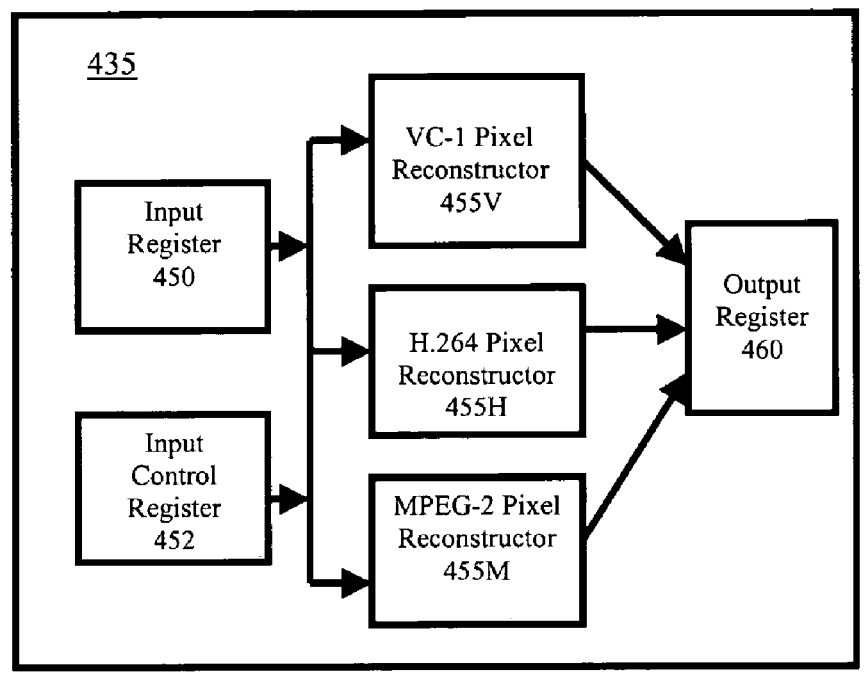
FIG. 2 is a block diagram of an exemplary pixel reconstructor in accordance with an embodiment of the present invention.

Referring now to FIG. 2, there is illustrated a block diagram of an exemplary pixel reconstructor 435 in accordance with an embodiment of the present invention. The ISQT 425 comprises input registers 450, an input control register 452, an MPEG-2 pixel reconstructor 455M, an H.264 pixel reconstructor 455H, a VC-1 pixel reconstructor 455V, and output registers 460. The MPEG-2 pixel reconstructor 455M is operable to reconstruct pixels from a prediction and a residual in accordance with the MPEG-2 standard. The H.264 pixel reconstructor 455H is operable to reconstruct pixels from a prediction and a residual in accordance with the H.264 standard. The VC-1 pixel reconstructor 455V is operable to reconstruct pixels from a prediction and a residual in accordance with the VC-1 standard. In certain embodiments of the present invention, the pixel reconstructor 455V can include an overlap transform filter.

The pixel reconstructor 435 receives the residual and predictions at input register 450. The CPU communicates the particular video encoding standard of the residuals and predictions by writing a parameter to the input control register 452, indicating the video encoding standard. Responsive thereto, the appropriate one of the MPEG-2 pixel reconstructor 455M, H.264 pixel reconstructor 455H, and VC-1 pixel reconstructor 455V the video data. Additionally, the CPU indicates whether the prediction is intra-coded or inter-coded.

Figure 3:
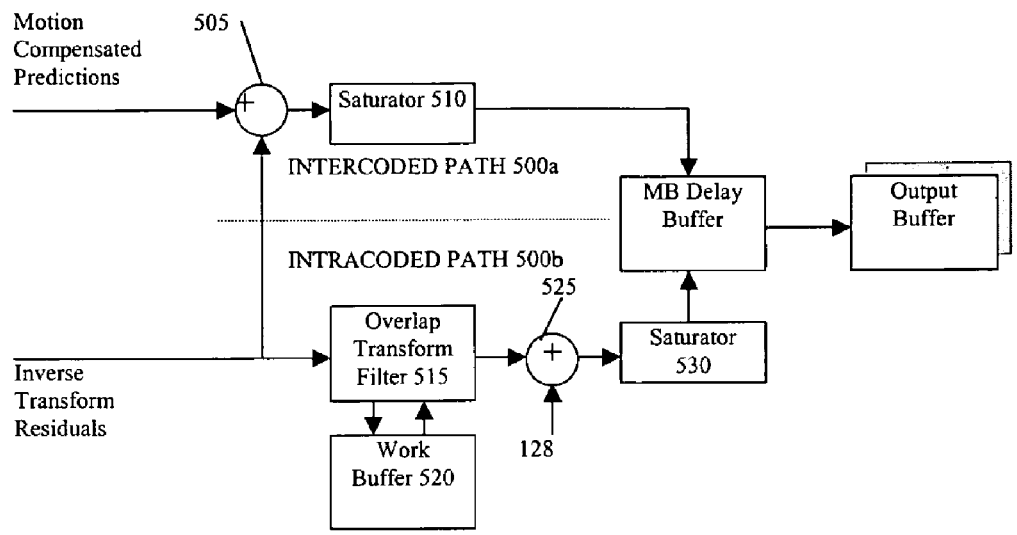
FIG. 3 is a block diagram of an exemplary VC-1 pixel reconstructor in accordance with an embodiment of the present invention.

Referring now to FIG. 3, there is illustrated a block diagram of an exemplary VC-1 pixel reconstructor 455V. The reconstructor 455V comprises an intercoded path 500a and an intracoded path 500b. Where a block is VC-1 intercoded, the interceded path 500a receives the prediction P and the residual R at adder 505. The residual R is received as 9-bit signed values while the prediction is received as 8-bit unsigned values. The adder 505 adds the prediction P and residual R, resulting in a 10-bit signed value. Saturator 510 saturates the output of the adder to a value between 0 and 255.

For intra-coded blocks, the intracoded path 500b receives the residuals R. The overlap transform filter 515 overlap transforms the residual R where the residual R is indicated to be overlap transformed. According to the VC-1 standard, the encoder encoding the residual R indicates whether the residual R is to be overlap transformed by setting a parameter associated with the residual R. The overlap transform filter 515 uses a buffer 520 for storage while performing the overlap transform. The buffer 520 can either be on-chip or form a portion of off-chip DRAM. The adder 525 adds the value 128 to the overlap transformed video data, and the saturator 530 saturates the result to between 0 and 255. According to certain embodiments of the invention, the residual input can be 10 bits signed and the output can be 8-bits unsigned.

Figure 4:
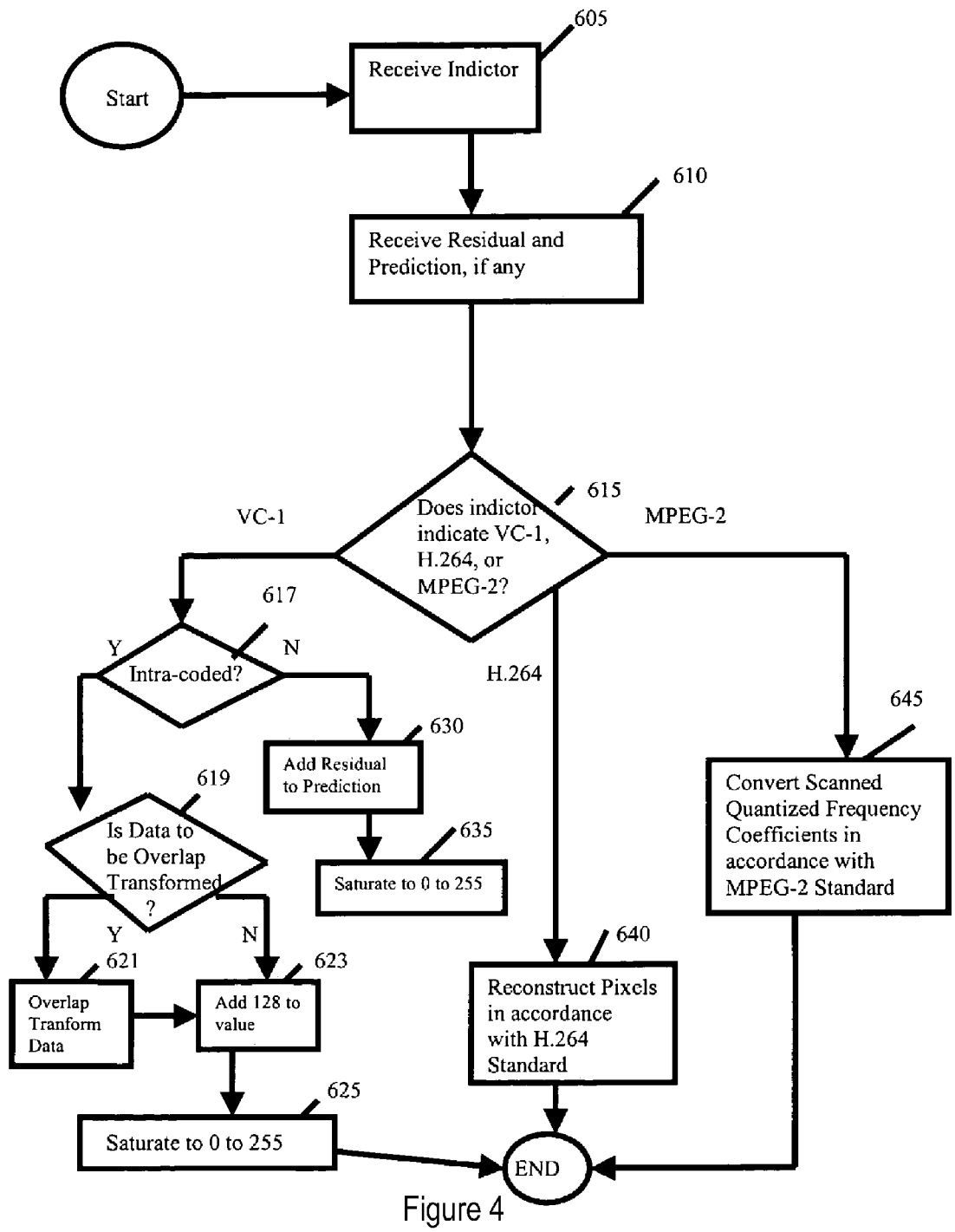
FIG. 4 is a flow diagram for reconstructing pixels in accordance with an embodiment of the present invention.

Referring now to FIG. 4, there is illustrated a flow diagram for reconstructing pixel data in accordance with an embodiment of the present invention. At 605, the pixel reconstructor 435 receives an indicator from the CPU indicating the encoding standard for the video data. At 610, the reconstructor 435 receives the residual E and the prediction P, if any.

If at 615, the indicator indicates that the video data is VC-1, at 617, the reconstructor 455V determines whether the video data is intra-coded or inter-coded. The reconstructor 455V determines whether the video data is intra-coded or inter-coded by examining an indicator in the input control register 452.

Where the video data is intra-coded, a determination is made at 619 whether the intra-coded data is to be overlap transformed or not. If the video data is intra-coded to be overlap transformed, the overlap transform filter 515 overlap transforms the video data at 621. At 623, the value 128 is added to the overlap transformed video data or residual, and the saturator saturates the result to between 0 and 255 at 625. If at 617 the video data is inter-coded, at 630, the adder 505 adds the residual and the prediction. At 635, the saturator 510 saturates the video data to a value between 0 and 255.

If at 615, the indicator indicates that the video data is encoded in accordance with H.264, the reconstructor 655H reconstructs pixel data in accordance with the H.264 standard at 640. If at 615, the indicator indicates that the video data is encoded in accordance with MPEG-2, the reconstructor 655H reconstructs pixel data in accordance with the MPEG-2 standard at 645.

The embodiments described herein may be implemented as a board level product, as a single chip, application specific integrated circuit (ASIC), or with varying levels of the decoder system integrated with other portions of the system as separate components.

The degree of integration of the decoder system will primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on VC-1, H.264, and MPEG-2 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A system comprising:
a first circuit configured to reconstruct pixels from residuals that encode video data in accordance with a first encoding standard; and
a second circuit configured to reconstruct pixels from residuals that encode video data in accordance with a second encoding standard; and
wherein the first encoding standard is VC-1 and the second encoding standard is H.264.

2. The system of claim 1, further comprising:
a third circuit configured to reconstruct video data from residuals that encode video data in accordance with MPEG-2.

3. A method comprising:
receiving an indicator distinguishing between a first encoding standard and a second encoding standard that both use residuals to encode video data in accordance with the encoding standards;
reconstructing pixel data in accordance with the first encoding standard, when the indicator indicates that the residuals encode video data in accordance with the first encoding standard; and
reconstructing pixel data in accordance with the second encoding standard, when the indicator indicates that the residuals encode video data in accordance with the second encoding standard; and
wherein the first encoding standard is VC-1, and the second encoding standard is H.264.

4. The method of claim 3, further comprising:
reconstructing pixels in accordance with MPEG-2, wherein the indicator indicates that the residuals encode video data in accordance with MPEG-2.

5. A product comprising:
non-transitory machine-readable storage; and
machine-readable instructions stored in the non-transitory machine-readable storage for causing a machine to:
receive an indicator distinguishing between a first encoding standard and a second encoding standard that both use residuals to encode video data in accordance with the encoding standards;
reconstruct pixel data in accordance with the first encoding standard, when the indicator indicates that the residuals encode video data in accordance with the first encoding standard; and
reconstruct pixel data in accordance with the second encoding standard, when the indicator indicates that the residuals encode video data in accordance with the second encoding standard; and
wherein the first encoding standard is VC-1, and the second encoding standard is H.264.

6. The product according to claim 5, further comprising instructions stored in the storage for:
reconstructing pixels in accordance with MPEG-2, wherein the indicator indicates that the residuals encode video data in accordance with MPEG-2.

7. The system of claim 1, wherein the first circuit comprises:
first reconstruction circuitry configured to reconstruct the pixels if the pixels are inter-coded, wherein the first reconstruction circuitry is configured to add 9-bit signed to 8-bit unsigned values to produce 10-bit signed values and saturating the 10 bit signed values between 0 to 255; and
second reconstruction circuitry configured to reconstruct the pixels if the pixels are intra-coded, wherein the second reconstruction circuitry is configured to determine if the pixels are overlap transformed.

8. The system of claim 1, further where the first circuit is configured to:
reorder a block of quantized frequency coefficients by placing a first quantized frequency coefficient ahead of a second quantized frequency coefficient, where the second quantized frequency coefficient has a lower magnitude than the first quantized frequency coefficient.

9. The system of claim 1, where the first circuit is configured to code quantized frequency coefficients by coding a run indicating a number of zero magnitude frequency coefficients following a first quantized frequency coefficient.

10. The system of claim 1, further comprising a buffer; and where the first circuit is configured to store video data in the buffer while performing an overlap transform.

11. The system of claim 10, where the buffer comprises off-chip dynamic random access memory (DRAM).

12. The system of claim 1, further comprising:
an input control register configured to store an indicator, the indicator indicating whether the residuals are encoding video data in accordance with the first encoding standard or the second encoding standard.

13. The system of claim 12, where the first circuit is configured to:
responsive to an indication that the residuals are encoding video data in accordance with VC-1, determine if the video data is intra-coded; and
responsive to determining that the video is intra-coded, determining whether to overlap transform the video data.

14. The product of claim 5, where the instructions are further configured to cause the machine to reorder a block of quantized frequency coefficients by placing a first quantized frequency coefficient ahead of a second quantized frequency coefficient, where the second quantized frequency coefficient has a lower magnitude than the first quantized frequency coefficient.

15. The product of claim 5, where the instructions are further configured to cause the machine to code quantized frequency coefficients by coding a run indicating a number of zero magnitude frequency coefficients following a first quantized frequency coefficient.

16. The product of claim 5, where the instructions are further configured to access an input control register configured to store an indicator, the indicator indicating whether the residuals are encoding video data in accordance with VC-1 or H.264.

17. The product of claim 16, where the instructions are further configured to:
responsive to the indication that the residuals are encoding video data in accordance with VC-1, determine if the video data is intra-coded; and
responsive to determining that the video is intra-coded, determining whether to overlap transform the video data.

18. The method of claim 3, further comprising reordering a block of quantized frequency coefficients by placing a first quantized frequency coefficient ahead of a second quantized frequency coefficient, where the second quantized frequency coefficient has a lower magnitude than the first quantized frequency coefficient.

19. The method of claim 3, further comprising coding quantized frequency coefficients by coding a run indicating a number of zero magnitude frequency coefficients following a first quantized frequency coefficient.

20. The method of claim 3, further comprising accessing an input control register configured to store an indicator, the indicator indicating whether the residuals are encoding video data in accordance with VC-1 or H.264.

* * * * *